US011378968B2

(12) United States Patent
Velten et al.

(10) Patent No.: US 11,378,968 B2
(45) Date of Patent: Jul. 5, 2022

(54) AUTONOMOUS GROUND VEHICLE (AGV) CART FOR ITEM DISTRIBUTION

(71) Applicant: Walmart Apollo, LLC, Bentonville, AR (US)

(72) Inventors: Jeremy L. Velten, Bella Vista, AR (US); Jason Bellar, Bella Vista, AR (US); Donald Ray High, Anderson, MO (US); Robert Cantrell, Herndon, VA (US)

(73) Assignee: Walmart Apollo, LLC, Bentonville, AR (US)

( * ) Notice: Subject to any disclaimer, the term of this patent is extended or adjusted under 35 U.S.C. 154(b) by 296 days.

(21) Appl. No.: 16/593,984

(22) Filed: Oct. 5, 2019

(65) Prior Publication Data

US 2020/0125109 A1   Apr. 23, 2020

Related U.S. Application Data

(60) Provisional application No. 62/749,099, filed on Oct. 22, 2018.

(51) Int. Cl.
  *G05D 1/00* (2006.01)
  *G05D 1/02* (2020.01)
  (Continued)

(52) U.S. Cl.
  CPC .......... *G05D 1/0225* (2013.01); *B65G 67/24* (2013.01); *B65G 69/24* (2013.01); *G05D 1/0088* (2013.01);
  (Continued)

(58) Field of Classification Search
  None
  See application file for complete search history.

(56) References Cited

U.S. PATENT DOCUMENTS 6,582,037 B1 *  6/2003  Rudick ................... G07F 11/32
                                                     312/334.44
7,261,511 B2     8/2007  Felder et al.
                    (Continued)

FOREIGN PATENT DOCUMENTS

CN             106347948 A       1/2017

OTHER PUBLICATIONS

Copenheaver, Blaine R., "International Search Report", International Application No. PCT/US2019/054904, dated Feb. 12, 2020, 4 pages.

(Continued)

*Primary Examiner* — James M McPherson

(57) ABSTRACT

A disclosed system for transporting items to destination locations, for example when receiving inventory at large retail locations, includes an autonomous ground vehicle (AGV) having at least one shelf; a shelf elevator operable to raise and lower the at least one shelf; a drive unit operable to move the AGV between a docking location and a destination location; the AGV able to position the at least one shelf at a different heights for loading and offloading items first height and a second height different from the first height, autonomously navigate between the docking location and the first destination location, and bid on delivery tasks. Some examples are further able to use a cartridge unit to expand cargo capacity. An AGV could analyze the currently-loaded weight and the remaining available space, and dynamically adjust the heights of the shelves according to the dimensions of the assigned items.

20 Claims, 6 Drawing Sheets

(51) Int. Cl.
*B65G 67/24* (2006.01)
*B65G 69/24* (2006.01)

(52) U.S. Cl.
CPC ... *G05D 1/0238* (2013.01); *G05D 2201/0216* (2013.01)

(56) References Cited

U.S. PATENT DOCUMENTS

| | | | |
|---|---|---|---|
| 8,882,432 B2 | 11/2014 | Bastian, II et al. | |
| 9,120,622 B1 | 9/2015 | Elazary et al. | |
| 9,914,627 B2 | 3/2018 | Shugen | |
| 10,119,332 B1* | 11/2018 | Schellens | E06C 7/14 |
| 11,156,010 B1* | 10/2021 | Corban | B64C 27/04 |
| 2007/0193854 A1 | 8/2007 | Eaton et al. | |
| 2008/0001372 A1 | 1/2008 | Hoffman et al. | |
| 2008/0077511 A1* | 3/2008 | Zimmerman | G05D 1/0246 |
| | | | 705/28 |
| 2008/0257686 A1* | 10/2008 | Freudelsperger | B65G 69/16 |
| | | | 198/468.8 |
| 2014/0222618 A1* | 8/2014 | Stamp | G06Q 30/0611 |
| | | | 705/26.4 |
| 2014/0341694 A1 | 11/2014 | Girtman et al. | |
| 2014/0348625 A1 | 11/2014 | Heitplatz et al. | |
| 2016/0187186 A1* | 6/2016 | Coleman | B66F 17/003 |
| | | | 177/1 |
| 2016/0209847 A1 | 7/2016 | Kuegle | |
| 2016/0214808 A1* | 7/2016 | Cyrulik | B65G 1/1373 |
| 2016/0280461 A1 | 9/2016 | Geiger et al. | |
| 2017/0066592 A1* | 3/2017 | Bastian, II | B25J 5/007 |
| 2017/0102711 A1 | 4/2017 | Watts | |
| 2017/0147975 A1 | 5/2017 | Natarajan et al. | |
| 2017/0286893 A1 | 10/2017 | Clark et al. | |
| 2018/0079601 A1* | 3/2018 | Khong | B62B 3/04 |
| 2018/0127211 A1 | 5/2018 | Jarvis et al. | |
| 2018/0127212 A1* | 5/2018 | Jarvis | B60P 1/02 |
| 2020/0151637 A1* | 5/2020 | Gupta | G06Q 30/08 |
| 2020/0209865 A1* | 7/2020 | Jarvis | G06Q 10/08355 |
| 2021/0194245 A1* | 6/2021 | Tobin | H02J 3/003 |

OTHER PUBLICATIONS

Copenheaver, Blaine R., "Written Opinion", International Application No. PCT/US2019/054904, dated Feb. 12, 2020, 6 pages.

Eriksson et al., "Launch and recovery systems for unmanned vehicles onboard ships. A study and initial concepts", Apr. 10, 2013, retrieved Jan. 28, 2020, <https://www.diva-portal.org/smash/get/diva2:783979/FULLTEXT01.pdf>, 96 pages.

* cited by examiner

AUTONOMOUS GROUND VEHICLE (AGV) CART FOR ITEM DISTRIBUTION

BACKGROUND

In large retail settings, the delivery, unloading, and sorting of items can be a significant aspect of operational efficiency. Convoluted, wasteful, and labor-intensive operations can degrade efficiency and negatively impact profitability. In some conventional approaches, this delivery, unloading, and sorting process has been a largely manual process, involving employees unloading items from a delivery vehicle, placing the items on carts, and then pushing or pulling the carts around the retail floor space to the proper shelf location.

Such a labor-intensive process introduces the potential of delays and wasted efforts when, for example, an employee is mistaken about the correct shelf location (which can occur when the employee is new or the shelf location has recently changed), or the cart is loaded with multiple items that are each destined for disparate shelf locations. Additionally, the manner in which a cart is loaded can affect the efficiency of unloading the items when the cart is at a destination location for one of the items on the cart.

SUMMARY

A disclosed system for transporting items to destination locations, for example when receiving inventory at large retail locations, includes an autonomous ground vehicle (AGV) having at least one shelf; a shelf elevator operable to raise and lower the at least one shelf; a drive unit operable to move the AGV between a docking location and a destination location; the AGV able to position the at least one shelf at a different heights for loading and offloading items first height and a second height different from the first height, autonomously navigate between the docking location and the first destination location, and bid on delivery tasks. Some examples are further able to use a cartridge unit to expand cargo capacity.

BRIEF DESCRIPTION OF THE DRAWINGS

The disclosed examples are described in detail below with reference to the accompanying drawing figures listed below.

Figure 1:
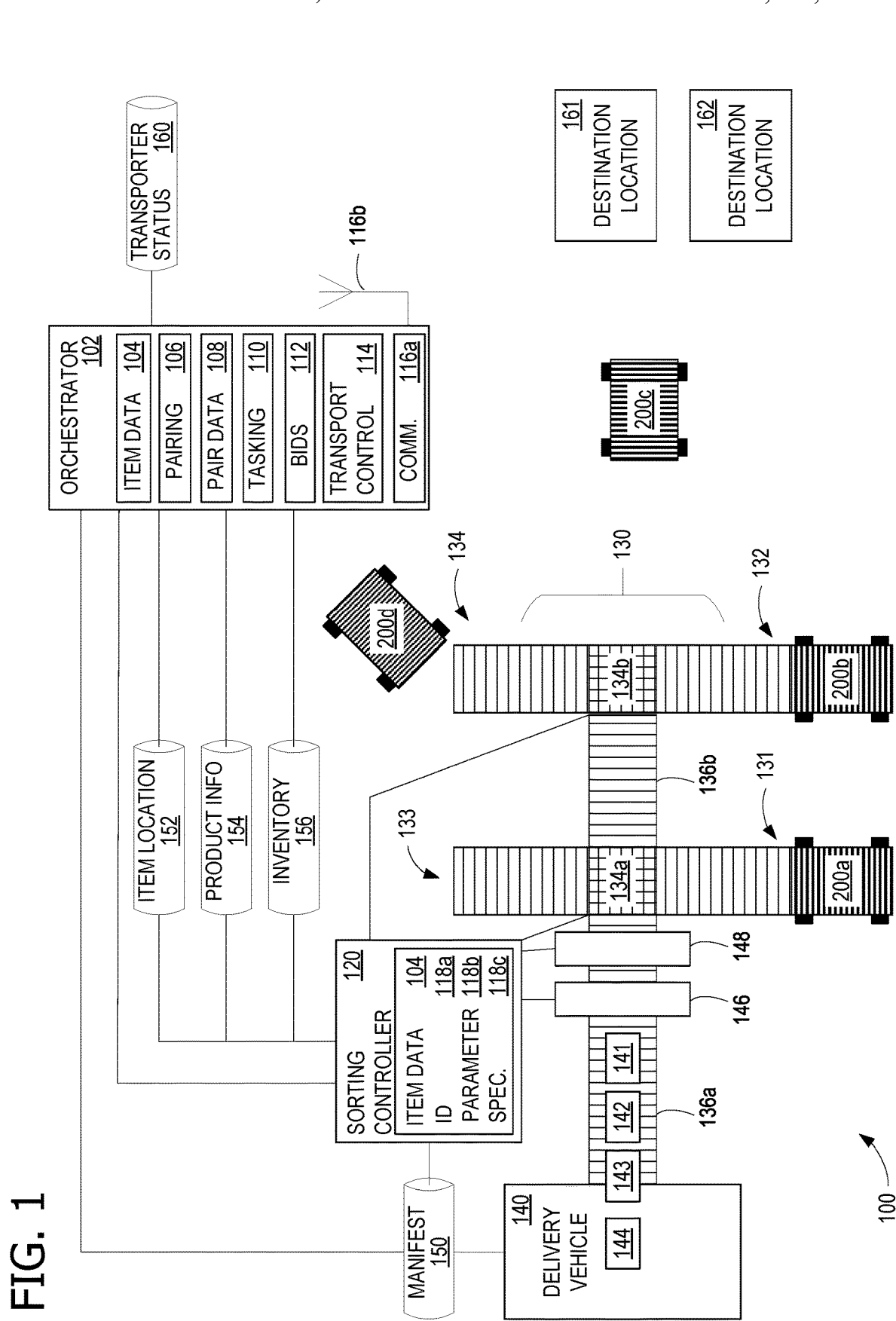
FIG. 1 illustrates an exemplary flexible automated sorting and transport arrangement.

Corresponding reference characters indicate corresponding parts throughout the drawings. Elements in the figures are illustrated for simplicity and clarity and have not necessarily been drawn to scale. For example, the dimensions and/or relative positioning of some of the elements in the figures may be exaggerated relative to other elements to help to improve understanding. Also, common but well-understood elements that are useful or necessary in a commercially feasible embodiment may not be depicted, in order to facilitate a less obstructed view.

DETAILED DESCRIPTION

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as 'In at least some embodiments, . . . . For brevity and clarity of presentation, this implied leading clause is not repeated ad nauseum.

Currently, many receiving processes in retail environments (e.g., unloading and sorting) are manual and labor intensive. Prior to the arrival of a delivery vehicle, employees may arrange a sorting area by positioning carts and pallets at specific destination locations. For example, some pallets may be intended to hold products that are destined for aisle displays and/or promotions. When a delivery vehicle arrives at the retail facility, items may be unloaded onto a relatively fixed and stationary conveyor extending linearly and may be manually pushed downstream along the conveyor surface. In some of these processes, employees may read item identification labels to identify the items as specific inventory products and then make a decision as to the appropriate destination location. Such a manual process is subject to error when the employees are not sufficiently trained or attentive, and is labor-intensive.

A disclosed system for transporting items to destination locations, for example when receiving inventory at large retail locations, includes a conveyor assembly comprising a plurality of docking locations; an item identifier operable to read identification data; an orchestrator operable to, based at least on the identification data, pair items with AGVs; and a sorting controller operable to, based at least on the identification data and the pairings, route items to specific docking locations where AGVs are docked. AGVs bid on delivery tasks and can adjust shelf height in order to facilitate loading and unloading. The AGVs can thus provide an effectively seamless conveyor solution—either rollers on the conveyor surface move items or rollers on the underside of the AGV move the AGV with the items—with at least some degree of autonomy.

An automated sorting and transport arrangement described herein leverages on-board intelligence to make decisions and uses a plurality of data sources, including inventory and transportation information. A centralized orchestrator may direct a fleet of autonomous assets, using artificial intelligence (AI) to track assets and make optimal decisions for tasking the fleet of autonomous assets to perform item delivery operations with efficient resource usage. For example, the delivery time of may be minimized, or the most efficient energy usage may be realized, within some given constraints.

A disclosed system for transporting items to destination locations, for example when receiving inventory at large retail locations, includes an AGV having at least one shelf; a shelf elevator operable to raise and lower the at least one shelf; a drive unit operable to move the AGV between a docking location and a destination location; the AGV able to position the at least one shelf at a different heights for loading and offloading items first height and a second height different from the first height, autonomously navigate between the docking location and the first destination location, and bid on delivery tasks. Some examples are further able to use a cartridge unit to expand cargo capacity. An AGV could analyze the currently-loaded weight and the remaining available space, and dynamically adjust the heights of the shelves according to the dimensions of the assigned items.

An AGV topped by a conveyor or roller system becomes an otherwise indistinguishable addition to a belt or roller system link while it is attached. When one or more items are loaded, the AGV can detach from the primary conveyor assembly and drive itself to the start of another, for example, a conveyance into a kiosk or direct to a shelf. The AGV effectively closes the physical gap between the two, and the item can roll onto the AGV and then off the AGV as if there was a single, uninterrupted conveyance line. This mirrors, in principle, how a ferry is the end of a roadway on one side of a river and becomes the beginning of a roadway once the ferry reaches the other. Thus, in some examples, no special system is required to load or unload the AGV because the AGV top or hold is effectively a part of the conveyance system with which it is used.

AGVs may wait at a distance from the primary conveyor assembly and when an item is paired with the AGV, the AGV will be instructed to dock and receive the item. Upon reception of the item, the AGV may wait in place to receive another item, deliver the item, or detach from the primary conveyor assembly and wait in a holding area until it is instructed to either return to the primary conveyor assembly to receive another item or deliver the item at a delayed time. Specific shelves may be used, based on item height, weight (for example heavier, shorter items on lower shelves), or the nearest corresponding shelf height at the delivery destination location. Shelves may be repositionable, such as aligning the shelf of an AGV with the height of the rollers of the docking location, when receiving an item, and the height of the destination shelf or kiosk intake when delivering an item.

FIG. 1 illustrates an exemplary flexible automated sorting and transport arrangement 100. The illustrated example of arrangement 100 includes an orchestrator 102, a sorting controller 120, and a conveyor assembly 130 comprising a plurality of docking locations 131, 132, 133, and 134. Conveyor assembly 130 also includes a first conveyor track 136a, a second conveyor track 136b, and sorting positions 134a and 134b. In some examples, conveyor tracks 136a and 136b are gravity conveyors with unpowered rollers in which items roll along due to a gentle downward slope, or pushed along by a human. In some examples, conveyor tracks 136a and 136b include powered rollers and/or a powered belt. In some examples, sorting positions 134a and 134b use sorting arms or directional rollers, in order to route items in a particular direction. Although two sections of conveyor track, two sorting positions, and four docking locations are illustrated, it should be understood that a different number of these elements may be used in alternative examples. In some examples, arrangement 100 may be constructed of aluminum, using polyvinyl chloride (PVC) rollers, in order to reduce weight, and may have modular construction in order to facilitate rapid assembly and disassembly, and compact storage.

Rollers on first conveyor track 136a and second conveyor track 136b may collectively define the conveying surface of conveyor assembly 130. In this form, items 141-144 (and others) may be unloaded from a delivery vehicle 140 at a delivery location (such as at the loading dock of a shopping facility) and may be deposited on first conveyor track 136a, which serves as a staging area for items passing through an item identifier 146 and a measurement module 148. Item identifier 146 is operable to read identification data of first item 141, identification data of second item 142, identification data of third item 143, and identification data of any other items being offloaded from delivery vehicle 140, such as fourth item 144. As configured in the example, item identifier 146 is operable to read identification data when an item is disposed on conveyor assembly 130 (specifically, on first conveyor track 136a) and passes beneath or through item identifier 146. In some examples, item identifier 146 includes a barcode scanner to read a barcode on items 141, 142, 143, 144, and any other items unloaded from delivery vehicle 140.

The illustrated example further includes a measurement module 148 operable to measure a parameter of items 141, 142, 143, 144, and any other items unloaded from delivery vehicle 140. Some examples of measurement module 148 include a weight measurement module, an optical dimensional measurement module, or both. Thus, the measured parameters include weight, dimension, shape, and/or color, in various examples. This permits determination of damage to any of items 141, 142, 143, 144, when one or more of measured weight, dimensions, shape, color, or some other parameter does not match expected values. In some examples, sorting portions 134a and 134b are bi-directional and include a first set of rollers configured to propel an item in the forward direction and a second set of rollers to divert an item in a second direction (sideways). In some examples, the second set of rollers elevate when an item is to be diverted. If the item is to proceed in the forward direction, the second set of rollers is not elevated. In this manner, sorting portions 134a and 134b can sort items in multiple directions (e.g., left or right).

Figure 2A:
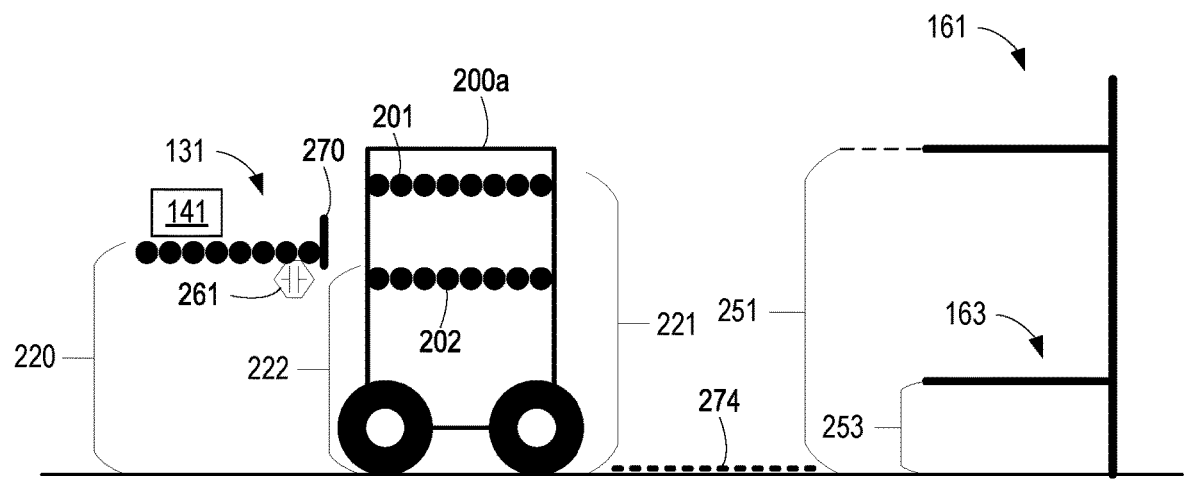
FIG. 2A illustrates an exemplary autonomous ground vehicle (AGV) that may be used with the arrangement of FIG. 1.
Figure 2B:
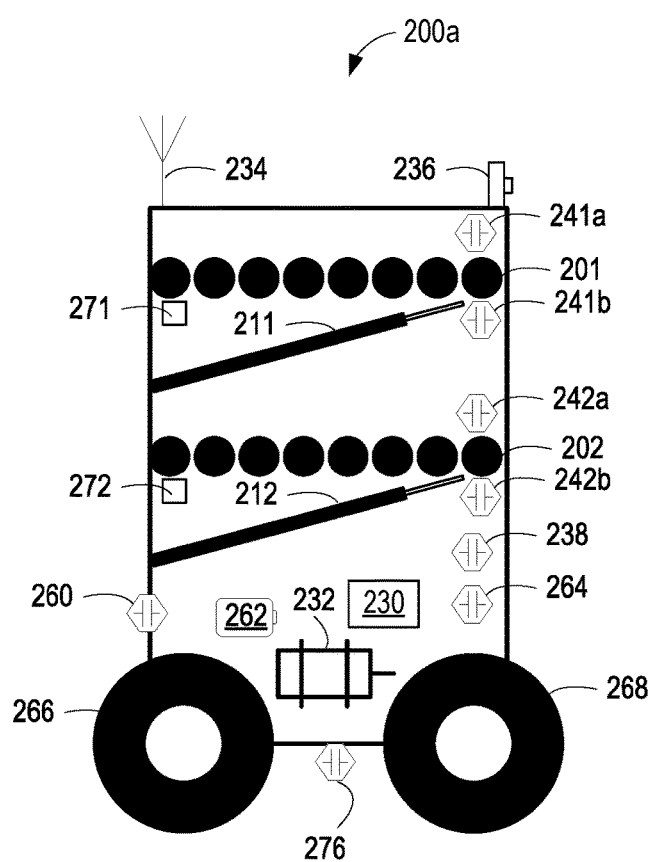
FIG. 2B illustrates the AGV of FIG. 2A in greater detail.

Four AGVs 200a-200d are shown, and are described in further detail with respect to FIGS. 2A and 2B. As illustrated, first AGV 200a is docked at first docking location 131; second AGV 200b is docked at second docking location 132; third AGV 200c is maneuvering between docking location 133 and some destination location; and fourth AGV 200d is shown as being in the process of docking at fourth docking location 134.

A sorting controller 120 is in communication with sorting portions 134a and 134b, item identifier 146, and measurement module 148. Sorting controller 120 is operable to, based at least on item identification data 118a (read from item 141 by item identifier 146 and stored within item data 104) and pairing data 108 (provided by orchestrator 102), route first item 141 to first docking location 131, and route second item 142 to second docking location 132. To accomplish this, in some examples, sorting controller 120 accesses multiple data sets 150-156. For example, sorting controller 120 accesses cargo manifest 150 which is optionally provided as an electronic data set stored in an electrical device accompanying delivery vehicle 150 or stored elsewhere and associated with delivery vehicle 150.

Additionally, sorting controller 120 accesses item location information 152, product information 154, and inventory data 156. In an exemplary operation, when delivery vehicle 140 arrives, orchestrator 102 and sorting controller 120 receive cargo manifest 150, to identify the items on delivery vehicle 140 that require sorting and distribution to locations within a facility, for example first and second destination locations 151 and 152. As items 141-144 are unloaded from delivery vehicle 140, identification data 118a is read from items 141-144 (and other items) by item identifier 146 and stored within item data 104 within or accessible to sorting controller 120. Sorting controller 120 uses product information 154 to locate item specification data 118c. Item specification data 118c includes stored parameter values of the various items 141-144, such as weight, dimensions, shape, and color. Item parameter measurements 118b, measured by measurement module 148 as items 141-144 pass though (or nearby, within range of sensors) are sent to sorting controller 120. Measured and stored parameter values are compared, in some examples, to ascertain whether any items are damaged. If so, then based at least on a comparison between a parameter measurement and a stored parameter value, an item is routed to a disposal location rather than a docking location where an AGV is waiting to deliver the item to a display shelf location (or other customer pick-up location, such a kiosk or automated storage and retrieval system (ASRS)).

However, in the absence of detected damage, when routed to first docking location 131, first item 141 will be loaded onto AGV 200a for delivery to a first destination location 151. When routed to second docking location 132, second item 142 will be loaded onto AGV 200b for delivery to a second destination location 152. In this manner, items 141 and 142 may be delivered to destination locations 151 and 152, respectively. In the event that damage had been detected for first item 141, sorting controller 120 is operable to, based at least on a comparison between the parameter measurement and a stored parameter value, route the first item to a third location (e.g., docking location 133) instead of docking location 131.

An orchestrator 102 is in communication with sorting controller 120, and also accesses some or all of data sets 150-156. In some configurations, orchestrator 102 is one or more processing units or computing nodes, such as computing node 700 of FIG. 7, local to arrangement 100. In some configurations, orchestrator 102 is provided as a cloud-based service. Orchestrator 102 is operable to, based at least on identification data 118a of first item 141, pair first item 141 with first AGV 200a and, based at least on identification data 118a of second item 142, pair second item 142 with second AGV 200b (which is a different AGV than first AGV 200a). To accomplish this, and other tasks, orchestrator 102 includes a copy of item data 104, a tasking module 110, a pairing module 106, pairing data 108, a transport control 114, and a communication module 116a that communicates with AGVs 200a-200d wirelessly via wireless interface 116b. Wireless interface 116b may include any combination of near field communication (NFC), Bluetooth®, Wi-Fi, or another wireless protocol.

In operation, when orchestrator 102 is alerted to the presence of first item 141 on conveyor assembly 130, for example by receiving identification data 118a for item 141, orchestrator 102 will attempt to pair item 141 with one or AGVs 200a-200d using pairing module 106. Orchestrator 102 may use item location information 152 to ascertain where item 141 should be delivered. If orchestrator 102 determines that one of AGVs 200a-200d is suitable for delivering item 141, such as, for example, AGV 200a is already tasked with delivering other items to the same or nearby destination location, orchestrator 102 will pair item 141 with AGV 200a and generate pairing data 108 pairing item 141 with AGV 200a. Orchestrator 102 retains the current status of the AGVs with which it has been paired (registered), including the location of each AGV. Therefore, at least one of orchestrator 102 and sorting controller 120 is able to ascertain that AGV 200a is docked at docking location 131. Thus, sorting controller 120 will, based at least on identification data 118a for item 141 and the pairing 108 of item 141 with AGV 200a, route item 141 to docking location 131 where it will be loaded onto AGV 200a.

Similarly, when orchestrator 102 is alerted to the presence of second item 142 on conveyor assembly 130, for example by receiving identification data 118a for item 142, orchestrator 102 will attempt to pair item 142 with one of AGVs 200a-200d. Orchestrator 102 may use item location information 152 to ascertain where item 142 should be delivered. If orchestrator 102 determines that one of AGVs 200a-200d is suitable for delivering item 142, such as, for example, AGV 200b is already tasked with delivering other items to the same or nearby destination location, orchestrator 102 will pair item 142 with AGV 200b. At least one of orchestrator 102 and sorting controller 120 is able to ascertain that AGV 200b is docked at docking location 132. Thus, sorting controller 120 will, based at least on identification data 118a for item 142 and the pairing 108 of item 142 with AGV 200b, route item 142 to docking location 132 where it will be loaded onto AGV 200b. In addition to pairing an item with a transported, some examples of orchestrator 102 select a shelf of an AGV to receive an item. This can be based, for example, on the shelf height at the destination location (item destination information). Orchestrator 102 then instructs the AGV (e.g., one of AGVs 200a-200d) to align the selected shelf with the roller surface at the docking location. In some examples, orchestrator 102 may inform an AGV of the item size, weight, and destination shelf height, and permit the AGV to decide which shelf to use, based on the AGV's existing or expected loading.

However, if orchestrator 102 determines that none of the AGVs currently docked at conveyor assembly 130 is a good choice for delivering an item, orchestrator 102 will transmit (using communication module 116a) a delivery task for the item to the plurality of AGVs to which orchestrator 102 has been paired (registered) and which are available for performing delivery tasks (e.g., AGVs 200a-200d). AGVs 200a-200d will each then respond with bids for the delivery task, which are received by orchestrator 102. In some examples, the bids include the delivery time and estimated marginal power used (e.g., battery power) in accomplishing the task. Orchestrator stores the received bids 112 received in communications from the plurality of AGVs, such as AGVs 200a-200d. Based at least on the communications from a plurality of AGVs, orchestrator 102 performs a cost minimization operation to pair the item with an AGV. The cost minimization will be a system-wide minimization, including the plurality of AGVs 200a-200d.

For example, item 143 may be going to a destination nearby the destination of item 141. If AGV 200a has sufficient capacity to also carry item 143, then the marginal power that AGV 200a estimates that it will use to deliver item 143 will be fairly low. Additionally, since AGV 200a is already docked, the delivery time will be relatively quick. In contrast, in this example, AGV 200b has been tasked to deliver item 142 at a destination location a considerable distance away, and so the marginal power that AGV 200b estimates that it will use to deliver item 143 will be fairly high. Additionally, neither of AGVs 200c and 200d is in position yet, so they will each require a longer time than AGV 200a. Therefore, orchestrator 102 pairs item 143 with AGV 200a, and sorting controller 120 will route item 143 to docking location 131 for loading onto AGV 200a.

As an additional example, item 144 may be going to a destination nearby item 142, but AGV 200b does not have sufficient capacity to also carry item 144. Orchestrator 102 transmits the delivery tasks and pairs item 144 with AGV 200*d*. Orchestrator 102 instructs AGV 200*d* to dock at docking location 134 and further to align the height of a shelf of AGV 200*d* with the height of docking location 134 to receive item 144. This process follows what had occurred earlier when orchestrator 102 had instructed first AGV 200*a* to dock at first docking location 131 and instructed second AGV 200*b* to dock at second docking location 132. Orchestrator 102 had also instructed first AGV 20*a* to align a first shelf of first AGV 200*a* with first docking location 131 to receive first item 141. Upon AGV 200*a* and AGV 200*b* reporting full (or some other condition) orchestrator 102 instructs first AGV 200*a* to deliver first item 141 to first destination location 151 and instructs second AGV 200*b* to deliver second item 142 to second destination location 152.

FIG. 2A illustrates exemplary AGV 200*a* that may be used with the arrangement of FIG. 1, and FIG. 2B illustrates AGV 200*a* in greater detail. FIGS. 2A and 2B should be viewed together. AGV 200*a* is an exemplary AGV unit; AGVs 200*b*-200*d* may be similar or effectively identical. In some examples, AGV 200*a* has at least one shelf 201, a shelf elevator 211 operable to raise and lower shelf 201, and a drive unit 232 operable to move AGV 200*a* between docking location 131 and first destination location 151. AGV 200*a* also a navigation module 238, a wireless communication module 234, a monitoring module 264 operable to monitor a parameter of AGV 200*a*, and a controller 230 in communication with shelf elevator 211, drive unit 232, navigation module 238, and communication module 234. As illustrated, AGV 200*a* additionally includes a second shelf 202 and a second shelf elevator 212, in communication with controller 230, and operable to raise and lower shelf 202. Some examples of shelf elevators 211 and 212 permit adjusting shelves for tilting the shelves front/back and left/right, to provide for a level surface, if the conditions of the floor or conveyor assembly 130 warrant an adjustment.

When AGV 200*a* reaches docking location 131, docking sensor 260 on AGV 200*a* and docking sensor 261 at docking location 131 perform a handshaking operation and report to controller 230 and also orchestrator 102 and/or sorting controller 120 (both of FIG. 1) that AGV 200*a* is docked at docking location 131. Orchestrator 102 has determined that item 141 will be going to destination location 151, and another item, such as item 143 will be carried on AGV 200*a* to go to destination location 153. Since destination location 151 is a higher shelf than destination location 153, orchestrator has paired item 141 with shelf 201 of AGV 200*a* and item 143 with shelf 202. Since item 141 will arrive first, orchestrator 102 or sorting controller 120 instructs AGV 200*a* to position shelf 201, at height 221, to a first height that corresponds to aligning shelf 201 with a height 220 of docking location 131.

Controller 230 uses shelf elevator 211 to properly position shelf 201. As illustrated, shelf 201 comprises a conveyor surface that is implemented as a series of parallel rollers (shown in greater detail in FIGS. 3A-3D). At a later time, when AGV 200*a* is delivering item 141 to destination location 151, controller 230 will use shelf elevator 211 to position shelf 201 to a second height that corresponds to aligning shelf 201 with a height 251 of destination location 151. In some examples, height 251 is different from height 220. Returning to the loading process, when item 143 arrives, orchestrator 102 or sorting controller 120 instructs AGV 200*a* to position shelf 202, at height 222, to the height that corresponds to aligning shelf 202 with a height 220 of docking location 131. Similarly then, when AGV 200*a* is delivering item 143 to destination location 153, controller 230 will use shelf elevator 212 to position shelf 203 to a height that corresponds to aligning shelf 202 with a height 253 of destination location 153. When AGV 200*a* is docked and a shelf is properly positioned (e.g., at height 220), AGV 200*a* signals that it is ready to accept items, using docking sensor 260 and/or communication module 234.

Controller 230 communicates with orchestrator 102 and/or sorting controller 120 wirelessly using communication module 234, and may further communicate with orchestrator 102 and/or sorting controller 120 using docking sensors 260 and 261. In some examples, docking sensors 260 and 261 may additionally assist with final navigation in order to precisely align AGV 200*a* with docking location 131. Docking sensors 260 and 261 may include any combination of proximity sensors, navigation sensors, lidar, and contact sensors. Controller 230 communicates with orchestrator 102 and/or sorting controller 120 to transmit AGV parameter information to orchestrator 102, which is monitored by monitoring module a monitoring module 264. In some examples, the parameter information monitored by monitoring module 264 and transmitted to orchestrator 102 include load status, remaining load capacity, weight, remaining operational capacity, and position. An example of remaining operational capacity information is the charge remaining in battery 262 that powers drive unit 232 to maneuver AGV 200*a* between a docking location (such as docking location 131) and destination locations (such as destination locations 151 and 153). This information informs orchestrator 102 whether AGV has sufficient remaining power to complete its currently-assigned tasks, and take on additional tasks. Controller 230 communicates with orchestrator 102 to receive a delivery tasks, wirelessly transmit bids, and receive delivery instructions from orchestrator 102. Controller 230 includes logic for generating bids in response to receiving new tasks from orchestrator 102.

A collision avoidance module 236 is operable to sense pending collisions and instruct an avoidance maneuver. In some examples, collision avoidance module 236 includes an optical sensor; in some examples, collision avoidance module 236 includes an infrared or ultrasonic proximity sensor. In some examples, an optical sensor in collision avoidance module 236 can be monitored by a human or an AI process, in order to prevent collisions. Remote human monitoring may utilize communication module 234 for transmitting video and other status information regarding AGV 200*a*. In some examples, AI is implemented in controller 230, whereas in some examples, AI is implemented in a remote node that instructs controller 230. In some examples, machine learning (ML) may be used in navigation, collision avoidance, and pairing in order to minimize delivery times and maximize energy efficiency. AGV 200*a* may have a standard path of travel, according to a localization grid with floor navigation components 274, which may include magnetic strips, readable optical pathways, or other means to rapidly, reliably, and precisely determine location.

A conveyor gate 270 is kept raised until AGV 200*a* is in place and ready to accept items, so that items do not roll off docking location 131. Conveyor gate 270 acts as a barrier until it is lowered, in order to permit items to roll from docking location 131 onto AGV 200*a*. Similarly, roller brakes 271 and 272 on shelves 201 and 202, respectively, can prevent items on AGV 200*a* from rolling off shelves 201 and 202 while AGV 200*a* is in motion. Roller brakes 271 and 272 prevent the rollers on shelves 201 and 202 from turning. It should be understood that any combination of conveyor gates and roller brakes may be used on docking location 131 and AGV 200*a*. Sensors 241*a* and 242*a* monitor the positions of shelves 201 and 202, respectively, and comprise mechanical or optical sensors, in various embodiments. In some versions, sensors 241*a* and 242*a* are optical sensors and sense the presence and dimensions on shelves 201 and 202, respectively. Sensors 241*b* and 242*b* monitor the weight placed on each of shelves 201 and 202, respectively, and comprise mechanical or optical sensors, in various embodiments. In various examples, sensors 241*a*-242*b* include mechanically-actuated contacts for position-sensing, optical sensors for shelf position and load sensing, and weight sensors.

In some examples, AGV 200*a* may recharge battery 262 at docking location 231. In some examples AGV 200*a* may be an unmanned aerial vehicle (UAV), such as an autonomous UAV, rather than a ground vehicle or AGV. In some examples, a plurality of AGVs may be used in tandem, such as an AGV ferrying items to a UAV. In some examples, AGV 200*a* may include human navigation and control options, such as push bars. Tracking sensor 276, coupled to controller 230 can track floor navigation components 274 to assist AGV 200*a* with autonomously navigating between docking locations and destination locations.

Therefore, AGV 200*a* has at least one shelf 201; shelf elevator 211 operable to raise and lower shelf 201; drive unit 232 operable to move AGV between a docking location and a first destination location; navigation module 238; wireless communication module 234; monitoring module 264 operable to monitor a parameter of AGV 200*a*; and a controller 230 in communication with shelf elevator 211, drive unit 232, navigation module 238, and communication module 234 to: position shelf 201 at a first height and a second height different from the first height; autonomously navigate AGV 200*a* between a docking location and a destination location; transmit the AGV parameter to orchestrator 102 (of FIG. 1); and receive delivery instructions from orchestrator 102. In some examples, the monitored parameter comprises at least one selected from the list consisting of load status, remaining load capacity, weight, remaining operational capacity, and position. In some examples, shelf 201 comprises a conveyor surface. In some examples, shelf 201 comprises at least one selected from the list consisting of a roller brake and a conveyor gate. In some examples, shelf 201 comprises a sorting portion. In some examples, AGV 200*a* includes collision avoidance module 236 operable to sense pending collisions and instruct an avoidance maneuver. In some examples, controller 230 is operable to receive a notification of a delivery task, generate a bid for the delivery task, and wirelessly transmit the bid.

Figure 3A:
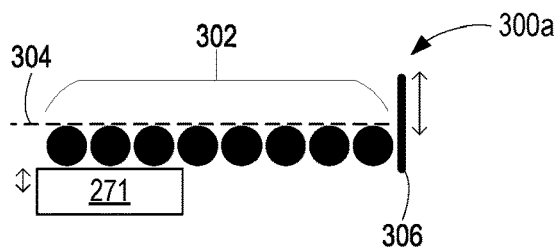
FIGS. 3A-3D illustrates various conveyor surface options for the AGV of FIGS. 2A-2B.

FIGS. 3A-3D illustrates various conveyor surface options for AGV 200*a*. FIG. 3A shows a side view of a shelf 300*a* that forms some examples of shelf 201. Shelf 300*a* comprises a plurality of rollers 302, the top of which forms a conveyor surface 304. Plurality of rollers 302 may be stopped from turning (and therefore moving any items on conveyor surface 304 by roller brake 271. Roller brake 271 may be actuated, either by engaging to prevent plurality of rollers 302 from turning, or by being released (disengaged) to permit plurality of rollers 302 to turning. A conveyor gate 306 may also be actuated, either by raising to prevent an item from moving off of conveyor surface 304 (and therefore off of shelf 300*a*), or by being lowered to permit an item to move off of conveyor surface 304 (and therefore off of shelf 300*a*). It should be understood that any combination of roller brakes and conveyor gates may be used in any number and location as may be needed to control undesired movement of items on shelf 300*a*.

Figure 3B:
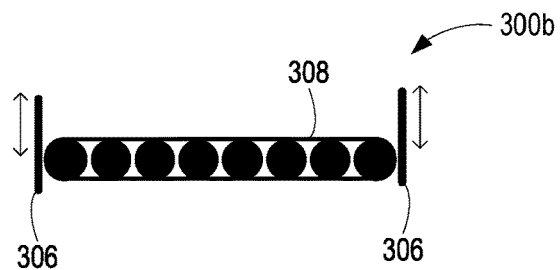

FIG. 3B shows a side view of a shelf 300*b* that also forms some examples of shelf 201. Shelf 300*b* comprises a roller belt 308, the top of which forms a conveyor surface. Some examples of shelf 300*b* also include conveyor gates 306 at each end, to selectively be actuated to permit an item to move on or off of conveyor belt (and therefore on or off of shelf 300*b*).

Figure 3C:
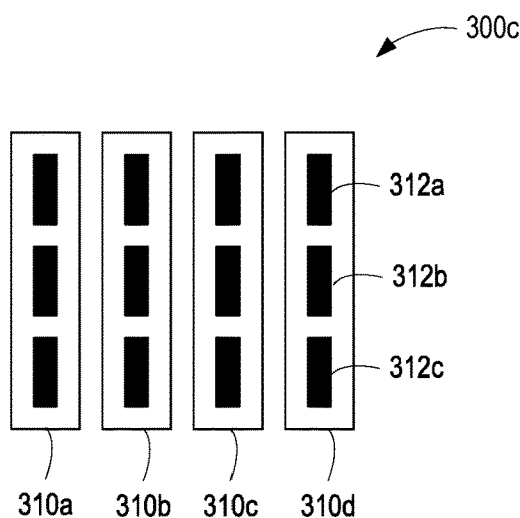

FIG. 3C shows a top view of a shelf 300*c* that also forms some examples of shelf 201. Shelf 300*c* comprises a plurality of primary rollers 310*a*-310*d*, each of which has an orthogonal set of secondary rollers, to permit sideways movement. For example, orthogonal secondary rollers 312*a*-312*c* are illustrated on primary roller 310*d*. In an implemented system, each of primary rollers 310*a*-310*d* would have a sufficient number of orthogonal sets of secondary rollers so that whatever portion of a primary roller was facing upward, an item could still move laterally. Shelf 300*c* is just one example of a sorting portion surface that permits items to move forward, backward, left, and right, depending on which set of rollers is turning.

Figure 3D:
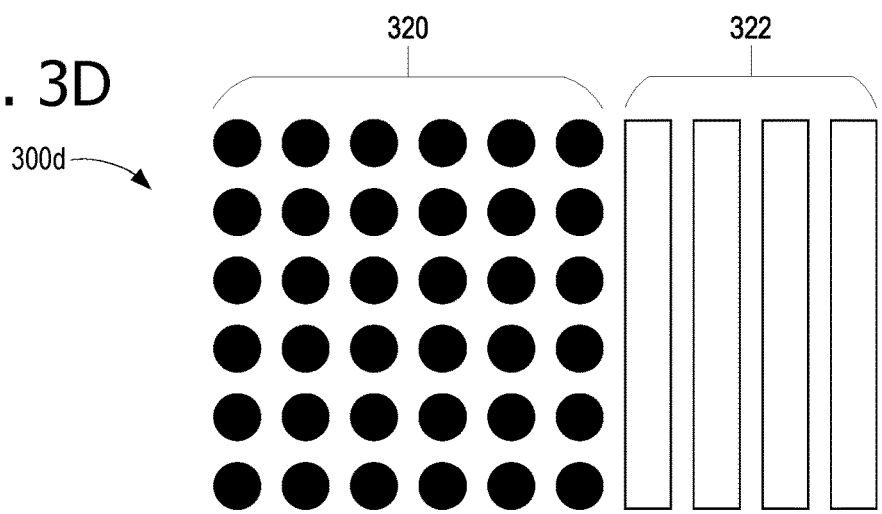

FIG. 3D shows a top view of a shelf 300*d* that also forms some examples of shelf 201. Shelf 300*d* is an alternative form of a sorting portion surface; others are known in the art. Shelf 300*d* comprises a plurality of spherical rollers 320. In some examples, a directional braking system beneath plurality of spherical rollers 320 may restrict motion to one plane of rotation or another. As illustrated, a side wing 322 is adjacent to plurality of spherical rollers 320, to permit sorting items on an AGV. In some examples, side wing 322 may fold in order to be out of the way, when not in use.

Figure 4:
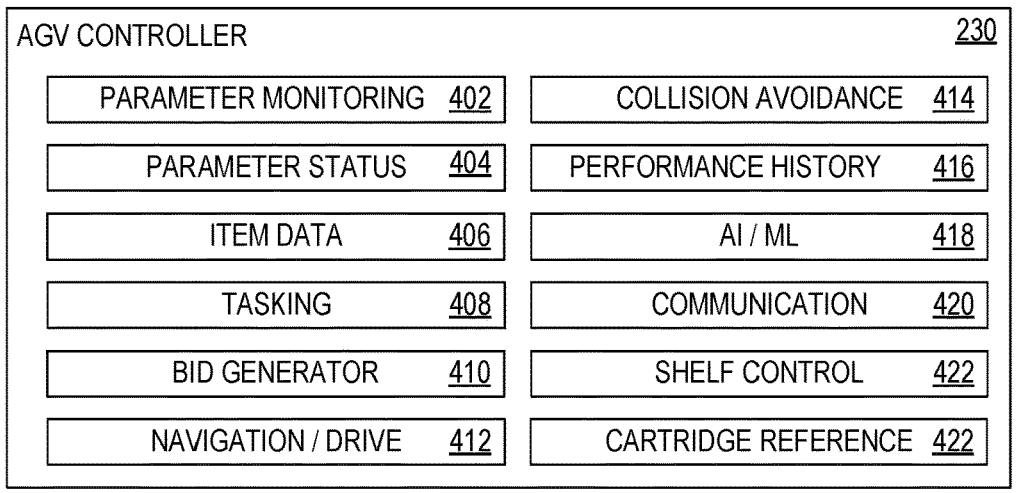
FIG. 4 illustrates an AGV controller.

FIG. 4 illustrates an example of AGV controller 230. The illustrated controller 230 includes a parameter monitoring module 402, parameter status data 404 (which may be used in forming bids on tasks and/or transmitted to orchestrator 102), item data 406 regarding the size, weight, and destination of items being carried by the AGV, and the AGVs tasking. Tasking data 408 includes delivery instructions for items already on the AGV, and requiring delivery, or an instruction to navigate to a particular docking location to load one or more items. Controller 230 also includes a bid generator 410, which is used to respond to tasks, and identify what level of effort and amount of time would be required for the AGV to perform a particular delivery task. Controller 230 also includes a navigation and drive control logic 412, used for autonomously navigating to a destination location or docking location, and a collision avoidance logic 414 that instructs an avoidance maneuver when sensing a pending collision. An avoidance maneuver includes any of steering, decelerating, stopping, and accelerating. Examples of navigation and drive control logic 412 and collision avoidance logic 414 work with navigation module 238, collision avoidance module 236, drive unit 232, and tracking sensor 276 to autonomously navigate and maneuver an AGV.

A performance history 416, including successful delivery tasks is used as a training data set for ongoing training of an AI and ML (AI/ML) module 418. AI/ML module 418 assists with navigation, including steering and driving, along with route planning and bid generation, for some AGVs, and also for shelf selection for incoming items, on some AGVs. Communication logic 420 stores protocols and data for use with communication module 234. A shelf control logic 422 takes input from sensors, such as sensors 241*a*-242*b*, to control vertical motion of shelves and make rotational adjustments for leveling or aligning with another conveyor surface. A cartridge reference module 424 assists shelf control 422 when a cartridge unit is used (see FIG. 5A), and different levels of the cartridge unit will be aligned with a conveyor assembly, in order to receive items into the cartridge unit. That is, cartridge reference module 424 will permit shelf control 422 to adjust a shelf according to the various relative height positions of shelves within a cartridge unit sitting on an AGV shelf.

Figure 5A:
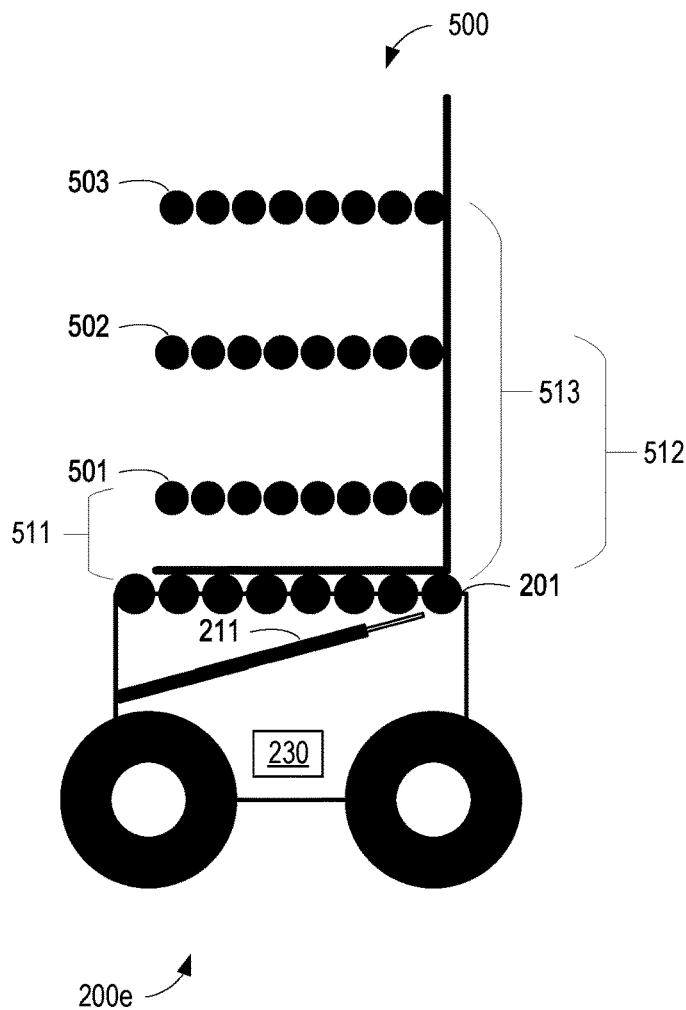
FIGS. 5A and 5B illustrate a cartridge unit for use with AGV of FIGS. 2A-2B.
Figure 5B:
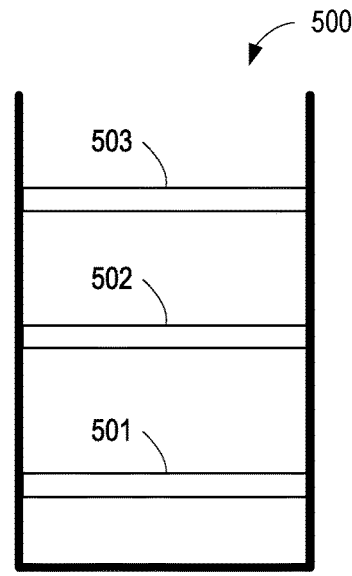

FIGS. 5A and 5B illustrate a cartridge unit 500 for use with an AGV 200 *e*, which may be similar to any of AGVs 200 *a*-200 *d*. FIG. 5A shows a side view of cartridge unit 500, and FIG. 5B shows a front view of cartridge unit 500. In the illustrated example, AGV 200 *e* has only a single shelf 201 and a single shelf elevator 211. Cartridge unit 500 has a first level 501 at a height 511 above shelf 201, a second level 502 at a height 512 above shelf 201, and a third level 503 at a height 513 above shelf 201. A different number of levels may be used in other cartridges. Cartridge reference module 424, in controller 230 is loaded with the values of heights 511-513, to permit AGV 200 *e* to raise or lower shelf 201 so that any of cartridge unit levels 501-503 may be aligned with a specified height of a destination location shelf or a conveyor assembly's conveyor surface.

Without a cartridge unit an AGV adjusts a shelf height to a first height corresponding to aligning the first shelf with a height of a docking location and adjusts a shelf height to a second height corresponding to aligning the shelf with a height of the destination location. However, with a cartridge unit, such as cartridge unit 500, disposed on a shelf an AGV adjusts the shelf to a first height corresponding to aligning a first level of a cartridge unit, such as level 501, with a height of the docking location and adjusts the shelf to a second height corresponding to aligning a second level of a cartridge unit, such as level 501, with the height of the docking location.

Figure 6:
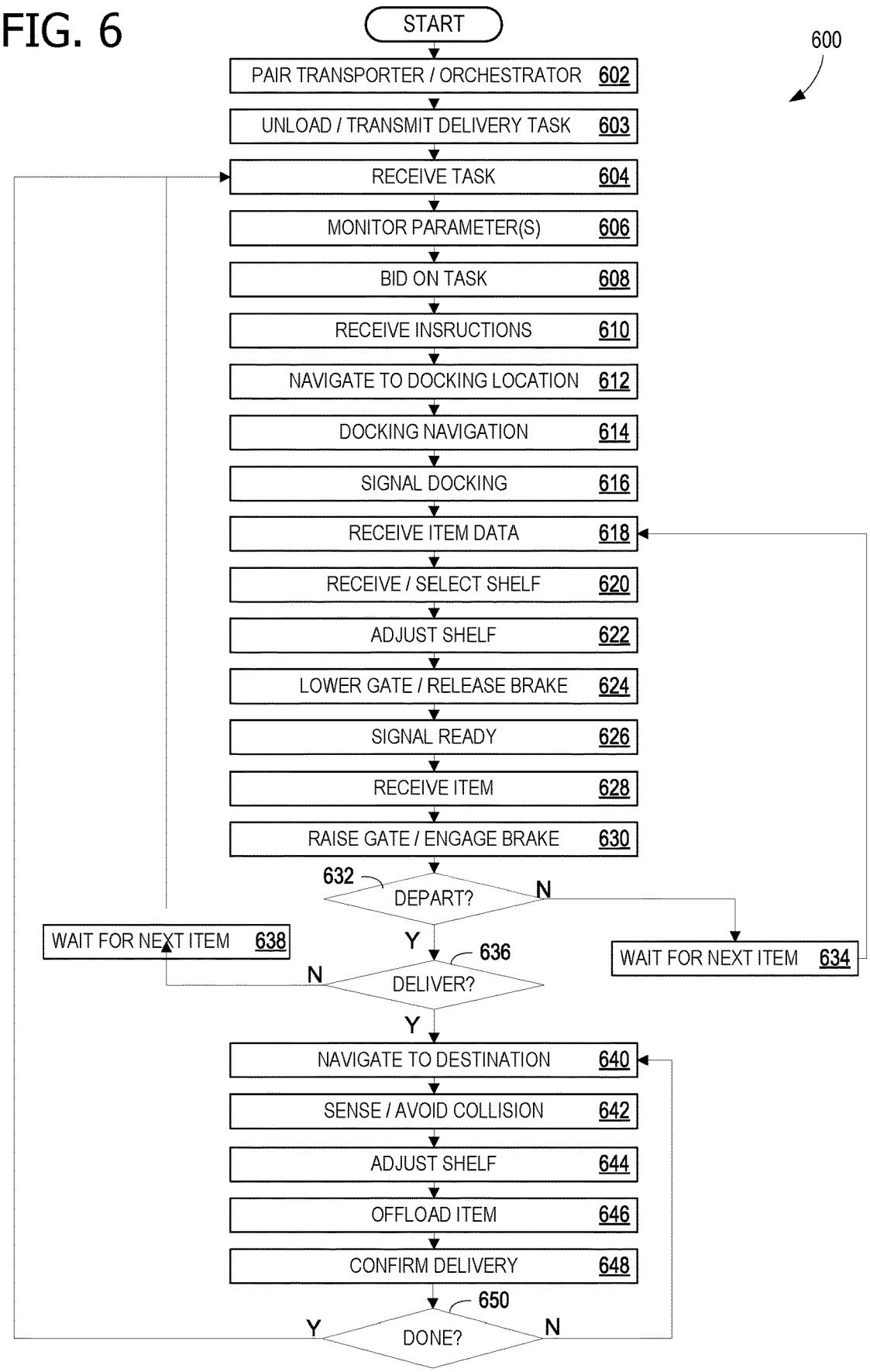
FIG. 6 shows a flow chart of operations associated with the AGV of FIGS. 2A-2B, and 5A.

FIG. 6 shows a flow chart 600 for operations that may be performed by any of AGVs 200*a*-200*e*. In operation 602, an AGV, such as AGV 200*a*, is paired (registered) with orchestrator 102 (of FIG. 1). This permits orchestrator 102 to use AGV 200*a* as a delivery asset. When a delivery vehicle arrives, items are unloaded onto conveyor assembly 130 (of FIG. 1), a cargo manifest is received by orchestrator 102, and orchestrator 102 transmits a first delivery task in operation 603. The AGV receives notification of the delivery task for an item at 604, for example, wirelessly. At 606, the AGV monitors at least one parameter of the AGV that is relevant to its ability to accomplish the delivery task, such as current load status, remaining load capacity, weight, remaining operational capacity, and position. Remaining operational capacity may include and indicating of a remaining battery charge.

The AGV then generates a bid for the delivery task. In some examples, generating the bid for the delivery task comprises, based at least on the at least one parameter of the AGV, generating the bid for the delivery task. For example, the AGV may generate the bid based at least on its position, which may require transit time to a docking location. Additionally, the AGV may generate the bid based at least on its battery charge, which indicates sufficient power to accomplish the task without detouring to a recharging location, and/or its load status being able to carry an item of specific weight and dimension. In some examples, both AGVs that are already docked and AGVs that are in transit will both did on a task. In such scenarios, an AGV that is already docked, has sufficient cargo capacity, and has an existing delivery task that routes the AGV nearby the destination location of the item referenced in the incoming task, may submit the winning (lowest cost) bid. In some scenarios, an AGV that has an existing task that routes it in a direction that is in a different direction than the destination location of the incoming task may lose a bid to another AGV that is not yet docked, but has no conflicting talking already assigned. Thus, an AGVs current tasking will affect its bid, in some examples. The AGV transmits the bid at 608, for example wirelessly.

If the AGV wins the bid, it receives instructions for the delivery task at 610, and navigates to a designated or selected docking location at 612. Docking navigation, in operation 614, often requires different sensors than long range navigation out on a retail floor space. For example, docking navigation may use ultrasonic, infrared, and other sensors for precision alignment, at 614. At 616, when the AGV has docked with a conveyor assembly, a handshake can signal the docking event. The AGV then receives information on the item being routed to the AGV, for example dimensions, weight, and destination location, possibly including the destination location shelf height. In operation 620, in some examples, the AGV is instructed which shelf to use for accepting the item, whereas in some examples, the AGV uses its on-board AI (in AI/ML module 418, for example) to select a shelf.

With the shelf identified, (if the AGV has more than one shelf), it will then be adjusted at 622 to permit the incoming item to be loaded by being aligned with the conveyor. That is, the shelf is adjusting, on the AGV, to a height for receiving the incoming item from the conveyor assembly. Based on the dimensions of the incoming item, other shelves that might be in the way, need to be elevated sufficiently that the incoming item can pass beneath them. Without the use of a cartridge unit, the AGV shelf will align its own conveyor surface with the conveyor surface of the docking location. That is, adjusting the shelf to a first height comprises aligning a conveyor surface of the AGV with a conveyor surface of the conveyor assembly to form a contiguous conveyor surface. However, with the use of a cartridge unit, the AGV shelf will align a selected level of the cartridge unit with the conveyor surface of the docking location. That is, adjusting the shelf to a first height comprises aligning a first level, of a cartridge unit disposed on the shelf, with a conveyor surface of the conveyor assembly. In some examples, at 624, prior to receiving the item from the conveyor assembly, a roller brake and/or a conveyor gate will be actuated to permit the item to move onto the AGV (or the cartridge unit on the AGV).

The AGV signals that it is ready to accept the item at 626, and the item is loaded (received) at 628. In some examples, after receiving the item from the conveyor assembly, a roller brake and/or a conveyor gate will be actuated to prevent the item from rolling off the AGV shelf, at 630. The AGV may remain at the docking station, or may be instructed to depart in operation 632. If the AGV is not instructed to depart, then it waits at 634 to receive item data for a second item, back in operation 618. Operations 620-630 will then be repeated, possibly including adjusting another shelf or adjusting the same shelf for a different cartridge unit level. Any shelf that is not planned for use, but is currently at the height of the conveyor assembly will need to be lifted out of the way. On this second (or a subsequent) pass through operation 622, a second shelf on the AGV will be adjusted to receive the next incoming item from the conveyor assembly. When a cartridge unit is used, adjusting the shelf to another height comprises aligning a second level of the cartridge unit with the conveyor surface of the conveyor assembly.

If the AGV is instructed to depart, as determined in decision operation 632, it may be to either wait in a holding area for loading more items, or for delivery, as determined in decision operation 636. If the AGV is to wait, it moves to a waiting area in operation 638. Otherwise, if the AGV had received delivery instructions for an item, in operation 632 when it was instructed to depart, it then begins autonomously navigating to a destination location in operation 640. An AGV may be instructed to deliver items if it is at or near capacity (e.g. at maximum weight, or so shelf space remains), or in some cases, even if it is only partially filled. Along the way, the AGV may sense a pending collision and perform a collision avoidance maneuver, such as steering out of the way, decelerating, accelerating, or stopping, in operation 642.

When the AGV arrives at the destination location, it adjusts the shelf in operation 644 to a height for unloading the first item at the first destination location, according to the item destination information. The item is offloaded at 646, and at 648, the AGV transmits a message to orchestrator 102, or some other node, to confirm delivery. At decision operation 650, the AGV determines whether it is still carrying more items remaining for delivery, or whether it is done. If it is not yet done delivering items, it proceeds to the next destination, in operation 640, possibly using AI/ML module 418 for route planning. Otherwise, the AGV waits to receive a notification of a delivery task for another item, in operation 604.

Exemplary Operating Environment

Figure 7:
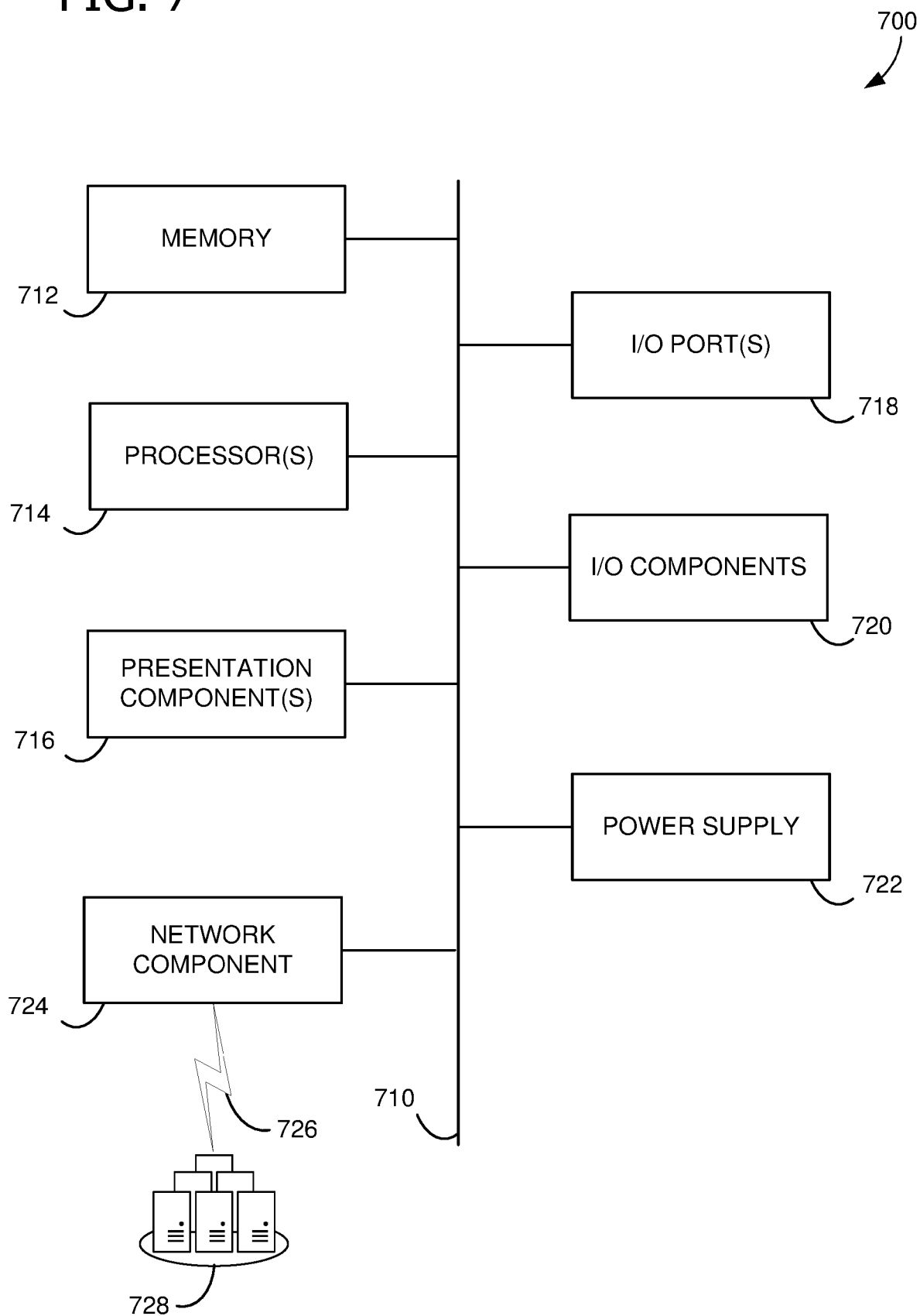
FIG. 7 is a block diagram of an example computing node for implementing aspects disclosed herein.

FIG. 7 is a block diagram of an example computing node 700 for implementing aspects disclosed herein and is designated generally as computing node 700. Computing node 700 is one example of a suitable computing environment and is not intended to suggest any limitation as to the scope of use or functionality of the invention. Neither should the computing node 700 be interpreted as having any dependency or requirement relating to any one or combination of components/modules illustrated. The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing nodes, etc. The disclosed examples may also be practiced in distributed computing environments, where tasks are performed by remote-processing devices that are linked through a communications network.

Computing node 700 includes a bus 710 that directly or indirectly couples the following devices: memory 712, one or more processors 714, one or more presentation components 716, input/output (I/O) ports 718, I/O components 720, a power supply 722, and a network component 724. Computing node 700 should not be interpreted as having any dependency or requirement related to any single component or combination of components illustrated therein. While computing node 700 is depicted as a seemingly single device, multiple computing nodes 700 may work together and share the depicted device resources. That is, one or more computer storage devices having computer-executable instructions stored thereon may perform operations disclosed herein. For example, memory 712 may be distributed across multiple devices, processor(s) 714 may provide housed on different devices, and so on.

Bus 710 represents what may be one or more busses (such as an address bus, data bus, or a combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and the diagram of FIG. 7 is merely illustrative of an exemplary computing node that can be used in connection with one or more embodiments. Distinction is not made between such categories as 'workstation,_ 'server,_ 'laptop,_ 'hand-held device,_ etc., as all are contemplated within the scope of FIG. 7 and the references herein to a 'computing node_ or a 'computing device._ Memory 712 may include any of the computer-readable media discussed herein. Memory 712 may be used to store and access instructions configured to carry out the various operations disclosed herein. In some examples, memory 712 includes computer storage media in the form of volatile and/or nonvolatile memory, removable or non-removable memory, data disks in virtual environments, or a combination thereof.

Processor(s) 714 may include any quantity of processing units that read data from various entities, such as memory 712 or I/O components 720. Specifically, processor(s) 714 are programmed to execute computer-executable instructions for implementing aspects of the disclosure. The instructions may be performed by the processor, by multiple processors within the computing node 700, or by a processor external to the client computing node 700. In some examples, the processor(s) 714 are programmed to execute instructions such as those illustrated in the flowcharts discussed below and depicted in the accompanying drawings. Moreover, in some examples, the processor(s) 714 represent an implementation of analog techniques to perform the operations described herein. For example, the operations may be performed by an analog client computing node 700 and/or a digital client computing node 700.

Presentation component(s) 716 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly among multiple computing nodes 700, across a wired connection, or in other ways. Ports 718 allow computing node 700 to be logically coupled to other devices including I/O components 720, some of which may be built in. Example I/O components 720 include, for example but without limitation, a microphone, keyboard, mouse, joystick, game pad, satellite dish, scanner, printer, wireless device, etc.

In some examples, the network component 724 includes a network interface card and/or computer-executable instructions (e.g., a driver) for operating the network interface card. Communication between the computing node 700 and other devices may occur using any protocol or mechanism over any wired or wireless connection. In some examples, the network component 724 is operable to communicate data over public, private, or hybrid (public and private) using a transfer protocol, between devices wirelessly using short range communication technologies (e.g., near-field communication (NFC), Bluetooth® branded communications, or the like), or a combination thereof. Network component 724 communicates over communication link 726 to a cloud resource 728. Various different examples of communication link 726 include a wired connection, wireless connection, and/or a dedicated link, and in some examples, at least a portion is routed through the internet. Various different examples of cloud resource 728 include data storage for the data sets 150-156 of FIG. 1, and computational services for some or all of the functionality of orchestrator 102 of FIG. 1 and AGV controller 230 of FIGS. 2B, 4A, and 5A.

Although described in connection with an example computing node 700, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing nodes, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device or computing node when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Exemplary Operating Methods and Systems

An exemplary system for transporting items to destination locations comprises: an AGV comprising: at least one shelf; a shelf elevator operable to raise and lower the at least one shelf; a drive unit operable to move the AGV between a docking location and a first destination location; a navigation module; a wireless communication module; a monitoring module operable to monitor a parameter of the AGV; and a controller in communication with the shelf elevator, the drive unit, the navigation module, and the communication module to: position the at least one shelf at a first height and a second height different from the first height; autonomously navigate the AGV between the docking location and the first destination location; transmit the AGV parameter to an orchestrator; and receive delivery instructions from the orchestrator.

An exemplary method of transporting items to destination locations comprises: docking, by an autonomous ground vehicle (AGV), with a conveyor assembly; adjusting, on the AGV, a first shelf to a first height for receiving a first item from the conveyor assembly; receiving, onto the AGV, the first item from the conveyor assembly; receiving, by the AGV, delivery instructions for the first item; autonomously navigating, by the AGV, to a first destination location; adjusting, on the AGV, the first shelf to a second height for unloading the first item at the first destination location; receiving, by the AGV, a notification of a delivery task for a second item; generating a bid for the delivery task; transmitting the bid; and receiving instructions for the delivery task.

One or more exemplary computer storage devices having computer-executable instructions stored thereon for transporting items to destination locations, which, on execution by a computer, cause the computer to perform operations comprising: docking, by an autonomous ground vehicle (AGV), with a conveyor assembly; adjusting, on the AGV, a first shelf to a first height for receiving a first item from the conveyor assembly; receiving, onto the AGV, the first item from the conveyor assembly; after receiving the first item from the conveyor assembly, actuating, on the AGV, at least one selected from the list consisting of a roller brake and a conveyor gate; receiving, by the AGV, delivery instructions for the first item; autonomously navigating, by the AGV, to a first destination location; sensing, by the AGV, a pending collision; performing, by the AGV, a collision avoidance maneuver; adjusting, on the AGV, the first shelf to a second height for unloading the first item at the first destination location; wirelessly receiving, by the AGV, a notification of a delivery task for a second item; monitoring at least one parameter of the AGV selected from the list consisting of load status, remaining load capacity, weight, remaining operational capacity, and position; based at least on the at least one parameter of the AGV, generating a bid for the delivery task; wirelessly transmitting the bid; and receiving instructions for the delivery task.

Alternatively, or in addition to the other examples described herein, examples include any combination of the following:

the at least one shelf comprises a conveyor surface;
the at least one shelf comprises at least one selected from the list consisting of a roller brake and a conveyor gate;
the at least one shelf comprises a sorting portion;
the first height corresponds to aligning the shelf with a height of the docking location and wherein the second height corresponds to aligning the shelf with a height of the destination location;
the first height corresponds to aligning a first level of a cartridge unit disposed on the shelf with a height of the docking location and wherein the second height corresponds to aligning a second level of the cartridge unit with the height of the docking location;
a collision avoidance module on the AGV operable to sense pending collisions and instruct an avoidance maneuver;
the monitored parameter comprises at least one selected from the list consisting of load status, remaining load capacity, weight, remaining operational capacity, and position;
the controller is further operable to: receive a notification of a delivery task, generate a bid for the delivery task, and wirelessly transmit the bid;
adjusting the first shelf to the first height comprises aligning a conveyor surface of the AGV with a conveyor surface of the conveyor assembly to form a contiguous conveyor surface;
adjusting, on the AGV, a second shelf to the first height for receiving a third item from the conveyor assembly;
adjusting, on the AGV, the first shelf to a third height for receiving a third item from the conveyor assembly;
adjusting the first shelf to the first height comprises aligning a first level, of a cartridge unit disposed on the first shelf, with a conveyor surface of the conveyor assembly;
adjusting the first shelf to the third height comprises aligning a second level of the cartridge unit with the conveyor surface of the conveyor assembly;
receiving the notification of the delivery task comprises wirelessly receiving the notification of the delivery task;
transmitting the bid comprises wirelessly transmitting the bid.
after receiving the first item from the conveyor assembly, actuating, on the AGV, at least one selected from the list consisting of a roller brake and a conveyor gate;
sensing, by the AGV, a pending collision;
performing, by the AGV, a collision avoidance maneuver;
monitoring at least one parameter of the AGV;
generating the bid for the delivery task comprises, based at least on the at least one parameter of the AGV, generating the bid for the delivery task; and
the at least one parameter of the AGV comprises at least one selected from the list consisting of load status, remaining load capacity, weight, remaining operational capacity, and position.

The order of execution or performance of the operations in examples of the disclosure illustrated and described herein may not be essential, and thus may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles 'a,_ 'an,_ 'the,_ and 'said_ are intended to mean that there are one or more of the elements. The terms 'comprising,_ 'including, _ and 'having_ are intended to be inclusive and mean that there may be additional elements other than the listed elements. The term 'exemplary_ is intended to mean 'an example of_ The phrase 'one or more of the following: A, B, and C_ means 'at least one of A and/or at least one of B and/or at least one of C.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for transporting items to destination locations, the system comprising:
    an autonomous ground vehicle (AGV) comprising:
        at least one shelf;
        a shelf elevator operable to raise the at least one shelf and lower the at least one shelf;
        a drive unit operable to move the AGV between a docking location and a first destination location;
        a navigation module;
        a wireless communication module; and
        a controller in communication with the shelf elevator, the drive unit, the navigation module, and the wireless communication module to:
            generate a bid for a delivery task, the bid including a time required to deliver an item of the delivery task and estimated power to be used to deliver the item;
            transmit the bid;
            position the at least one shelf at a first height and a second height different from the first height;
            autonomously navigate the AGV between the docking location and the first destination location; and
            receive delivery instructions corresponding to the delivery task from an orchestrator.

2. The system of claim 1 wherein the at least one shelf comprises a conveyor surface.

3. The system of claim 2 wherein the at least one shelf comprises at least one selected from the list consisting of: a roller brake and a conveyor gate.

4. The system of claim 1 wherein the at least one shelf comprises a sorting portion.

5. The system of claim 1 wherein the first height corresponds to aligning the at least one shelf with a height of the docking location and wherein the second height corresponds to aligning the at least one shelf with a height of the destination location.

6. The system of claim 1 wherein the first height corresponds to aligning a first level of a cartridge unit disposed on the shelf with a height of the docking location and wherein the second height corresponds to aligning a second level of the cartridge unit with the height of the docking location.

7. The system of claim 1 further comprising:
a collision avoidance module on the AGV operable to sense pending collisions and instruct an avoidance maneuver.

8. The system of claim 1 further comprising a monitoring module operable to monitor a parameter of the AVG, wherein the monitored AVG parameter comprises at least one selected from the list consisting of:
load status, remaining load capacity, weight, remaining operational capacity, and position.

9. The system of claim 1 wherein the controller is further operable to:
receive a notification of the delivery task; and
in response to receiving the notification, generate the bid for the delivery task.

10. A method of transporting items to destination locations, the method comprising:
docking, by an autonomous ground vehicle (AGV), with a conveyor assembly;
adjusting, on the AGV, a first shelf to a first height for receiving a first item from the conveyor assembly;
receiving, onto the AGV, the first item from the conveyor assembly;
receiving, by the AGV, delivery instructions for the first item;
autonomously navigating, by the AGV, to a first destination location;
adjusting, on the AGV, the first shelf to a second height for unloading the first item at the first destination location;
receiving, by the AGV, a notification of a delivery task for a second item;
generating a bid for the delivery task, the bid including a time required to deliver the second item and estimated power to be used to deliver the second item;
transmitting the bid; and
receiving instructions for the delivery task.

11. The method of claim 10 wherein adjusting the first shelf to the first height comprises aligning a conveyor surface of the AGV with a conveyor surface of the conveyor assembly to form a contiguous conveyor surface.

12. The method of claim 10 further comprising:
adjusting, on the AGV, a second shelf to the first height for receiving a third item from the conveyor assembly.

13. The method of claim 10 further comprising:
adjusting, on the AGV, the first shelf to a third height for receiving a third item from the conveyor assembly;
wherein adjusting the first shelf to the first height comprises aligning a first level, of a cartridge unit disposed on the first shelf, with a conveyor surface of the conveyor assembly; and
wherein adjusting the first shelf to the third height comprises aligning a second level of the cartridge unit with the conveyor surface of the conveyor assembly.

14. The method of claim 10 wherein:
receiving the notification of the delivery task comprises wirelessly receiving the notification of the delivery task; and
transmitting the bid comprises wirelessly transmitting the bid.

15. The method of claim 10 further comprising:
after receiving the first item from the conveyor assembly, actuating, on the AGV, at least one selected from the list consisting of:
a roller brake and a conveyor gate.

16. The method of claim 10 further comprising:
sensing, by the AGV, a pending collision; and
performing, by the AGV, a collision avoidance maneuver.

17. The method of claim 10 further comprising:
monitoring at least one parameter of the AGV;
wherein generating the bid for the delivery task comprises, based at least on the at least one parameter of the AGV, generating the bid for the delivery task; and
wherein the at least one parameter of the AGV comprises at least one selected from the list consisting of:
load status, remaining load capacity, weight, remaining operational capacity, and position.

18. One or more computer storage devices having computer-executable instructions stored thereon for transporting items to destination locations, which, on execution by a computer, cause the computer to perform operations comprising:
docking, by an autonomous ground vehicle (AGV), with a conveyor assembly;
adjusting, on the AGV, a first shelf to a first height for receiving a first item from the conveyor assembly;
receiving, onto the AGV, the first item from the conveyor assembly;
after receiving the first item from the conveyor assembly, actuating, on the AGV, at least one selected from the list consisting of:
a roller brake and a conveyor gate;
receiving, by the AGV, delivery instructions for the first item;
autonomously navigating, by the AGV, to a first destination location;
sensing, by the AGV, a pending collision;
performing, by the AGV, a collision avoidance maneuver;
adjusting, on the AGV, the first shelf to a second height for unloading the first item at the first destination location;
wirelessly receiving, by the AGV, a notification of a delivery task for a second item;
monitoring at least one parameter of the AGV selected from the list consisting of:
load status, remaining load capacity, weight, remaining operational capacity, and position;
based at least on the at least one parameter of the AGV, generating a bid for the delivery task, the bid including a time required to deliver the second item and estimated power to be used to deliver the second item;
wirelessly transmitting the bid; and
receiving instructions for the delivery task.

19. The one or more computer storage devices of claim 18 wherein the operations further comprise:
adjusting, on the AGV, a second shelf to the first height for receiving a third item from the conveyor assembly.

20. The one or more computer storage devices of claim 18 wherein the operations further comprise:
adjusting, on the AGV, the first shelf to a third height for receiving a third item from the conveyor assembly;
wherein adjusting the first shelf to the first height comprises aligning a first level, of a cartridge unit disposed on the first shelf, with a conveyor surface of the conveyor assembly; and
wherein adjusting the first shelf to the third height comprises aligning a second level of the cartridge unit with the conveyor surface of the conveyor assembly.

* * * * *